(12) United States Patent
McGlothlin et al.

(10) Patent No.: US 6,512,526 B1
(45) Date of Patent: Jan. 28, 2003

(54) USER SPECIFIC EXECUTION OF PROGRAMS

(75) Inventors: James P. McGlothlin, Austin, TX (US); Roy W. Stedman, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/376,116

(22) Filed: Aug. 17, 1999

Related U.S. Application Data (63) Continuation-in-part of application No. 09/169,324, filed on Oct. 9, 1998, now Pat. No. 6,262,726.

(51) Int. Cl.$^7$ ................................................ G09G 5/00
(52) U.S. Cl. ...................... 345/762; 345/765; 345/733; 345/764; 709/328
(58) Field of Search ................................ 345/762, 764, 345/765, 733, 744, 700; 709/328; 717/11, 1; 710/8, 10

(56) References Cited

U.S. PATENT DOCUMENTS

| 5,621,878 A | 4/1997 | Owens et al. ............... 395/326 |
| 5,634,058 A | 5/1997 | Allen et al. .................. 395/712 |
| 5,675,831 A | 10/1997 | Caputo ....................... 395/830 |
| 5,680,547 A | 10/1997 | Chang .................... 395/200.01 |
| 5,721,825 A | 2/1998 | Lawson et al. ........ 395/200.33 |
| 5,732,282 A | 3/1998 | Provino et al. ............. 395/830 |
| 5,740,422 A | 4/1998 | Foltz et al. .................. 395/609 |
| 5,794,052 A * | 8/1998 | Harding ........................ 717/11 |
| 5,815,712 A | 9/1998 | Bristor et al. ............... 395/701 |
| 5,838,322 A | 11/1998 | Nakajima et al. ........... 345/348 |
| 6,051,032 A * | 4/2000 | Harrison et al. .............. 717/11 |
| 6,061,695 A | 5/2000 | Slivka et al. ................ 707/513 |
| 6,078,747 A | 6/2000 | Jewitt ......................... 395/712 |
| 6,094,531 A * | 7/2000 | Allison et al. ................ 717/11 |
| 6,178,551 B1 * | 1/2001 | Sana et al. .................... 717/11 |
| 6,202,206 B1 * | 3/2001 | Dean et al. .................... 717/11 |
| 6,209,031 B1 * | 3/2001 | Casey et al. ................ 709/222 |

* cited by examiner

*Primary Examiner*—Crescelle N. Dela Torre
*Assistant Examiner*—Mylinh T Tran
(74) *Attorney, Agent, or Firm*—Baker Botts L.L.P.

(57) ABSTRACT

A computer system and method allows customization of a desktop of a user in a multiple user environment, such as a windows type operating system. Configuration files trigger a program to execute upon the invocation of the operating system by the user and install or delete elements. The program has a list associated with the program wherein if the list contains at least one element, the program checks whether the at least one element in the list has been executed on a desktop of a user; and if the elment has not been executed for the user, the program executes the at least one element. The at least one element may include custom desktop components. Configuration files may include a registry.

23 Claims, 10 Drawing Sheets

USER SPECIFIC EXECUTION OF PROGRAMS

CROSS REFERENCE

This application is a continuation-in-part application to a pending U.S. patent application with Ser. No. 09/169,324 entitled Factory Installing Desktop Components for an Active Desktop, filed Oct. 9, 1998, now U.S. Pat. No. 6,262,726.

BACKGROUND

1. Field

This field relates to software, and, more particularly to custom software for an operating system that executes for each user.

2. Description

Computer systems have attained widespread use for providing computer power to many segments of today's modern society. A personal computer system can usually be defined as a desk top, floor standing, or portable microcomputer that includes a system unit having a system processor and associated volatile and nonvolatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a group of users in the case of personal computers which serve as computer server systems) and are inexpensively priced for purchase by individuals or small businesses.

A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices.

Manufacturers of personal computers often pre-install an operating system, such as the Microsoft Windows 95™ operating system, the Microsoft Windows NT™ operating system, or the IBM OS/2™ operating system. These modern operating systems are increasingly large in term of both complexity and storage requirements, often requiring several megabytes of hard drive space. When a manufacturer installs an operating system, the manufacturer often uses another computer to copy an image of the operating system from a separate hard drive onto the target hard drive being created for the customer using a specialized software program.

Copying an image of a hard drive, rather than installing the operating system on each customer system, saves considerable time. However, once the image is created, it is quite difficult to customize the customer's system without either creating and copying a new image or turning on the customer's machine and providing the customizations.

Creating multiple images and copying the image most suited to the customer's request is helpful when installing standard applications, such as the Microsoft Office™ suite of applications, which are requested for multiple customers. Multiple images increase the complexity of the manufacturing process as well as increasing the computer requirements for making the images available to the installation process.

Furthermore, the manufacturer may wish to make small customizations to help the user get acquainted with the new computer and to help build brand identity and loyalty for the manufacturer. In addition, some large corporate customers may request a particular customization, such as an application to display the corporate PC usage guidelines to the customer's employee.

SUMMARY

A computer system and method for modifying a graphical user interface of the present invention allows customization of the graphical user interface, such as a windows type operating system. When invoked, the system reads one or more configuration files related to the operating system which invokes an installation program to install the custom desktop components. These configuration files may include a registry The custom desktop component includes graphical images added to the graphical user interface during such first invocation. The graphical image is related to an application or Active Desktop component which will be executed when the user selects the graphical image from the desktop layout. The computer system and method may also allow for several users to use the same computer system with a separate profile and desktop layout for each user. In such multiple user systems, the modification occurs for each of the several users. Following the execution of the application or Active Desktop component, the system may remove the graphical image associated with such application or Active Desktop component from the graphical user interface.

A manufacturing process of the present invention is useful in manufacturing systems with graphical user interfaces that are modified upon a first invocation by the user. The manufacturing process includes copying the operating system, configuration files, application programs, graphical image files, and installation programs onto the computer systems nonvolatile storage device. The configuration files are set to trigger the installation programs to execute upon the first invocation of the operating system by the user. The installation programs have been customized to perform modifications to the graphical user interface as described above.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
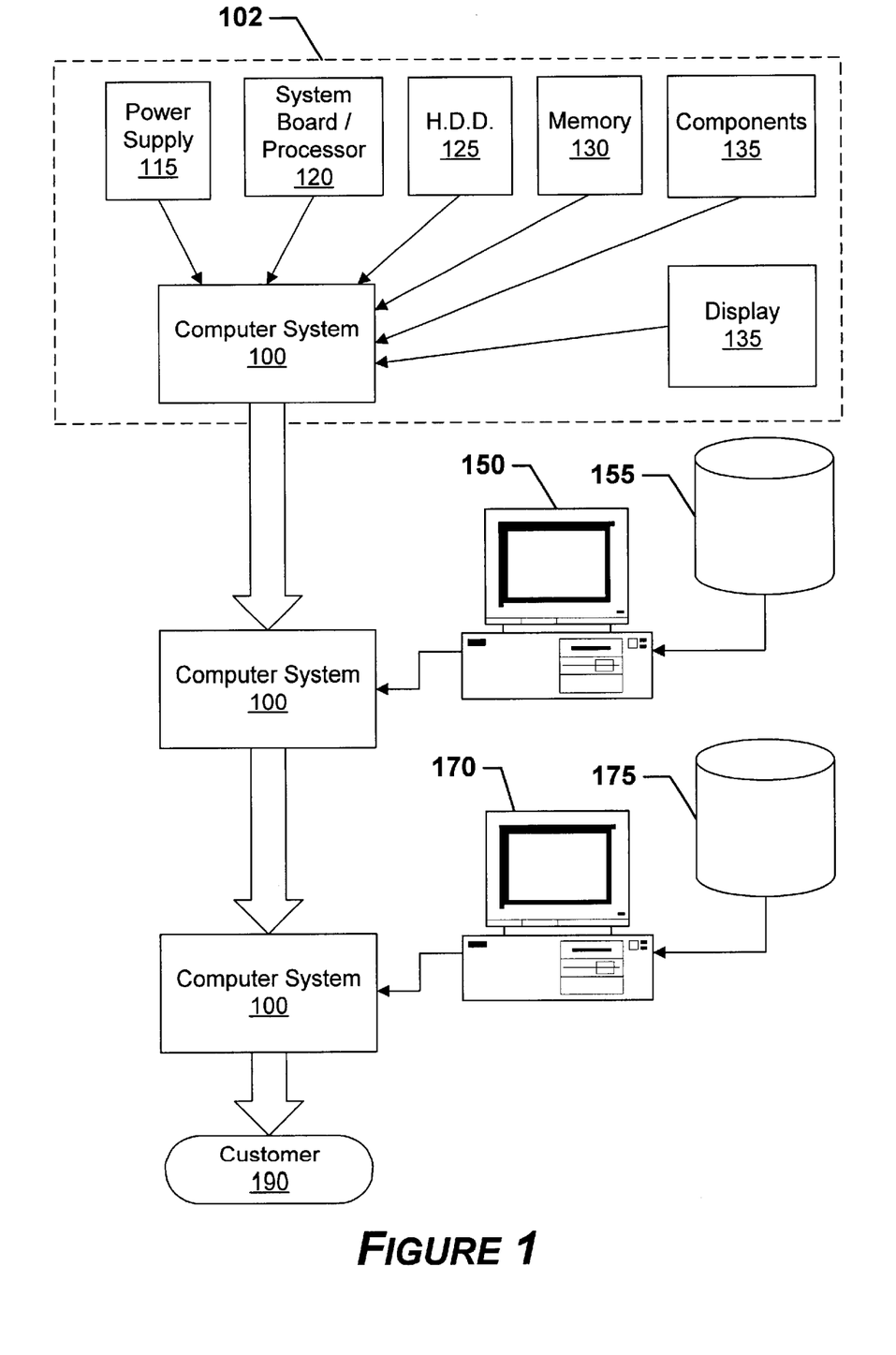
FIG. 1 is a block diagram showing a manufacturing process according to the present invention.

A personal computer manufacturing process is shown in FIG. 1. Computer system 100 is first assembled at hardware manufacture section 102 with various hardware components including a power supply 115 a system board with a processor 120, a nonvolatile storage device 125, and memory 130. Additional components 135 may also be installed and may include items such as a tape drive, a compact disk read-only-memory (CD-ROM), as well as other components that may have been ordered by the customer. Nonvolatile storage device 125 may be a hard disk drive or any device that holds information when the computer system is powered off.

After the hardware of computer system 100 is installed, computer system 100 is transferred to software installation section 104. During software installation section 104, a standard operating system and applications are installed by manufacturing computer system 150. Manufacturing computer system 150 reads disk images 155. Disk images 155 are stored onto a nonvolatile storage device by various means known by those skilled in the art. Manufacturing computer system 150 may also install selected components from software products to further customize computer system 100. Software packages and suites, such as Microsoft Office™, contain several software applications. In the case of Microsoft Office™, the suite contains a word processor (Microsoft Word™), a spreadsheet (Microsoft Excel™), a database (Microsoft Access™), a presentation application (Microsoft Powerpoint™), and a personal information manager (Microsoft Outlook™). Customers may request that any one or more of such applications from the suite be installed onto computer system 100. Manufacturing computer system can also be used to install such applications onto computer system 100. Computer system 100 is powered up and assists in the installation process and may also execute installation programs to install applications onto nonvolatile storage device 125. One method of creating a disk image is to manually create a model computer system configuration and use specialized software to copy an image of the disk from the model computer system. The operator of manufacturing computer system 150 may be a person or an automated program which determines which disk image should be installed to the nonvolatile storage device 125 previously installed in computer system 100.

To assist in the customization of computer system 100, a generic installation program and modified configuration files may be included in disk image 155 stored on and loaded onto the nonvolatile storage device 125 previously installed in computer system 100. The modified configuration files could contain instructions for the operating system to execute the generic installation program on the first invocation of the operating system by the end user, as is further described below.

Following software installation section 104 computer system 100 is in a condition which would allow it to be used by an end user. However, no customization has been performed at this point so the user could not be given special instructions or provided with customized information. At this point, computer system 100 is transferred to customization section 106. During customization section 106, computer system 100 may be customized by storing customized installation programs, applications and graphic files (collectively, "custom components") to nonvolatile storage device 125. Custom installation system 170 is used to transfer custom components 175 from a nonvolatile storage device connected to custom installation system 170. As will be appreciated by those skilled in the art, manufacturing system 150 and custom installation system 170 may be the same system. In addition, disk images 155 and custom components 175 may be stored on the same nonvolatile storage device. In addition, a local area network (LAN) may be used to connect manufacturing system 150 and custom installation system 170 to nonvolatile storage devices containing disk images 155 and custom components 175.

Configuration files used by the operating system installed on computer system 100 may to be modified to instruct the operating system to call the customized installation program upon the first invocation of the operating system by the end user. The customized installation program could be programmed to search for other customized components 175. As will be appreciated by those skilled in the art, the installation program could use several methods to search for other custom components 175, including providing a data file providing installation details about the customized components which is read and processed by the installation program. The customized installation program could also be used to remove standard icons or programs that normally are included with the operating system that the purchaser does not want users to use. These may include games or Internet browser programs (i.e., Microsoft Internet Explorer™, Netscape Navigator™) or any other application included with the operating system that the purchaser does not want employees using. In addition, the installation program could be programmed to handle errors encountered when searching for custom components 175 so that the end user would not see error messages if custom components 175 were not installed on computer system 100. This would allow a generic installation program to be placed on every computer system 100 from disk images 155 regardless of whether custom components 175 were loaded onto the nonvolatile storage device 125 of computer system 100.

The notification of the operating system can take place in several ways, two of which are disclosed below. First, the configuration files are modified prior to creating disk image 155 so that subsequent installations of the operating system would already contain the modified configuration file. A second method for modifying the configuration file occurs during the installation of custom components 175 by custom installation system 170. A manufacturer may choose to not provide custom components on every computer the manufacturer ships to customer at step 190. The first method advantageously increases speed as the installation file and modified configuration files are copied to the nonvolatile storage device 125 of computer system 100 prior to the copying of custom components 175 onto the nonvolatile storage device 125 of computer system 100. The second method advantageously avoids modifying the configuration files and placing the installation program onto the nonvolatile storage device 125 of computer system 100 unless custom components 175 are loaded by custom installation system 170. Following the loading of custom components 175, computer system 100 is ready for shipment to a customer at step 190.

Figure 2:
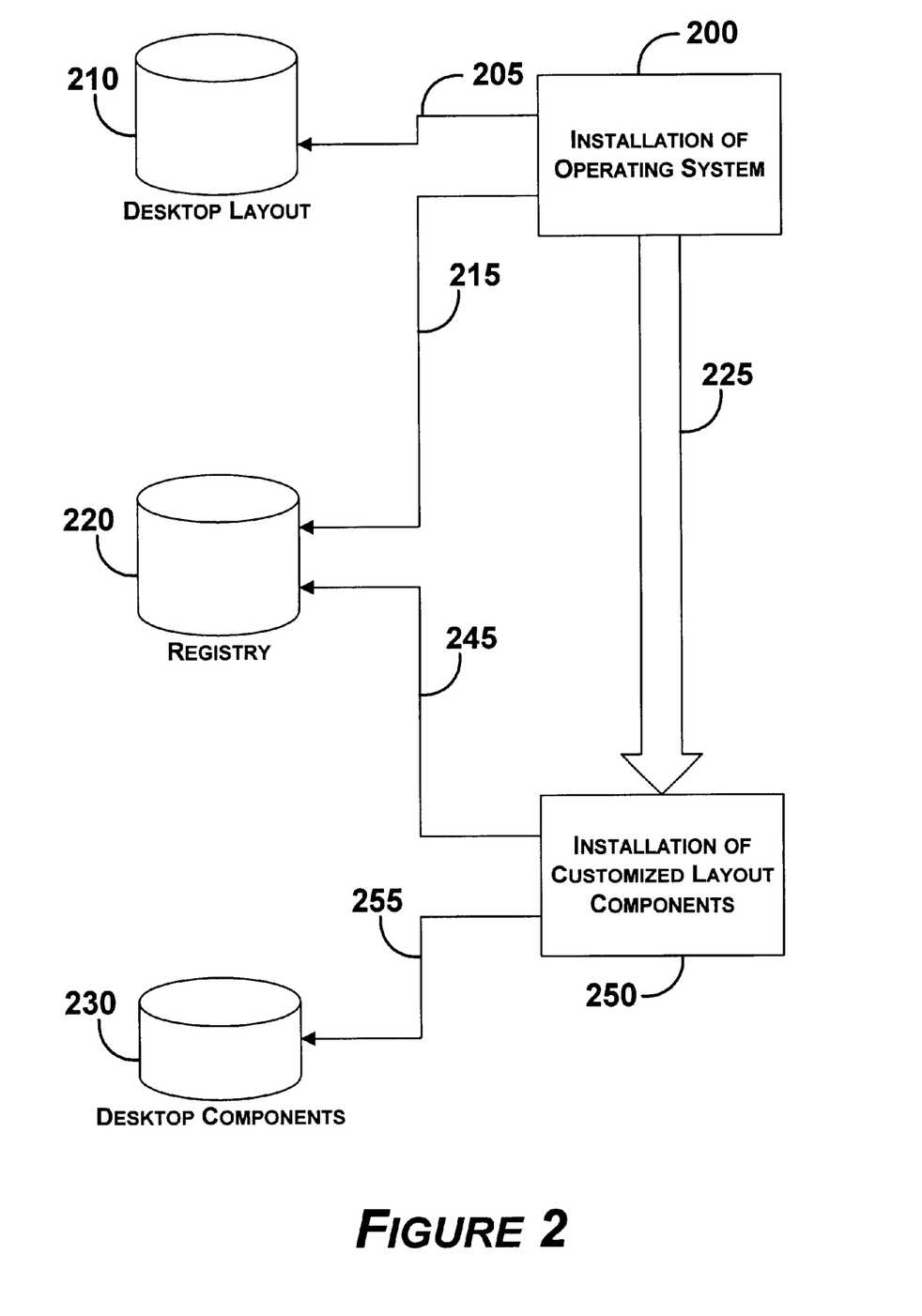
FIG. 2 is a block diagram showing the installation of the operating system and customizations according to the present invention.

FIG. 2 shows the software installation section 104 and customization section 106 process from the perspective of computer system 100. Files loaded onto the nonvolatile storage device 125 of computer system 100 include files for displaying a desktop layout 210 and configuration files 220. In some operating system, such as Windows 95™ and Windows NT™, the configuration files form a registry for storing configuration information. In Windows 95™, configuration information is stored in system files named system.dat and user.dat. The registry is divided into six sections containing "keys" and "subkeys." A utility called a "registry editor" (regedit.exe) is included with Windows 95™ for viewing the keys and subkeys. One of the keys provided by Windows 95™ is called a "run once" key which, as its name implies, only runs the program associated with the key one time. A key of this nature is useful when the end user is installing software purchased by the end user. The software installation program may load software onto the users hard drive, modify the system settings, and need to re-boot the system in order to execute the software. Configuration files 220, such as the registry are used in a novel way to customize the operating system display upon a first invocation of the operating system by the user and provide the customization and manufacturing advantages as discussed above. During configuration section 106, configuration files 220 are modified to correspond with desktop components 230 so that desktop components 230 are installed upon the first invocation of the operating system by the user.

Figure 3:
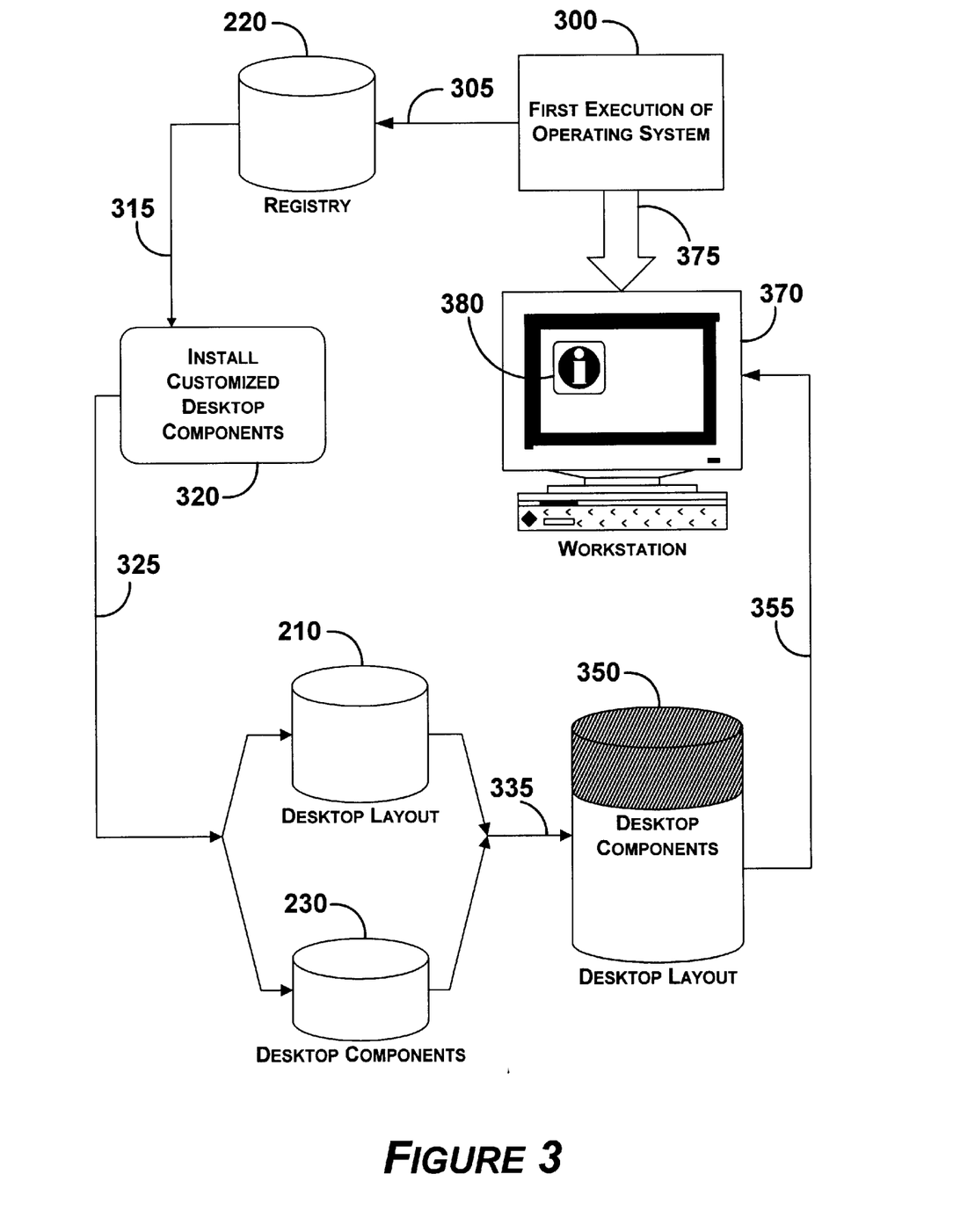
FIG. 3 is a block diagram showing the first execution of the operating system according to the present invention.

FIG. 3 shows generally a first execution of operating system 300 by an end user. Upon first execution of operating system 300, the operating system 300 reads configuration data from configuration files 220. The stored configuration files 220 within operating system 300 instruct operating system 300 to execute installation program 320 to install customized desktop components 230. Installation program 320 reads desktop component information 230 which includes one or more graphical images 380 associated with the desktop components 230. The installation program 320 then modifies the desktop layout 210 used by operating system 300 to display a new desktop layout 350 to the end user. The new desktop layout 350 includes graphical portions of desktop components 230.

A delay may be present between operating system 300 reading the configuration files 220 at step 305 and presenting the desktop layout at step 355. Ideally, the modification of the desktop layout 210 would complete prior to the operating system's display of the desktop layout at step 355. However, due to the nature of some operating systems, namely multiprocessing and threading of parallel processes, graphical objects, including the installed graphical image 380, may continue to appear for a short while after desktop layout 350 is displayed to the end user on his or her display device 370.

For some applications, it may be desirous to display graphical image 380 larger than other icons and graphics located on desktop layout 350 to draw user attention and encourage the end user to select graphical image 380. Information conveyed to the end user through selection of graphical image 380 may be introductory information, policy statements, marketing information from the manufacturer, or other types of information to be reviewed by the user once but the graphic image does not have to remain prominently displayed on the user's screen. Active Desktop components may also be placed on desktop layout 350. Active Desktop components allow placement of embedded objects, such as Internet Web pages and the like, onto desktop layout 350. This allows placement of a link to an Internet Web page from the users address so that the contents of the Web Page may periodically change without changing desktop layout 350.

Figure 4:
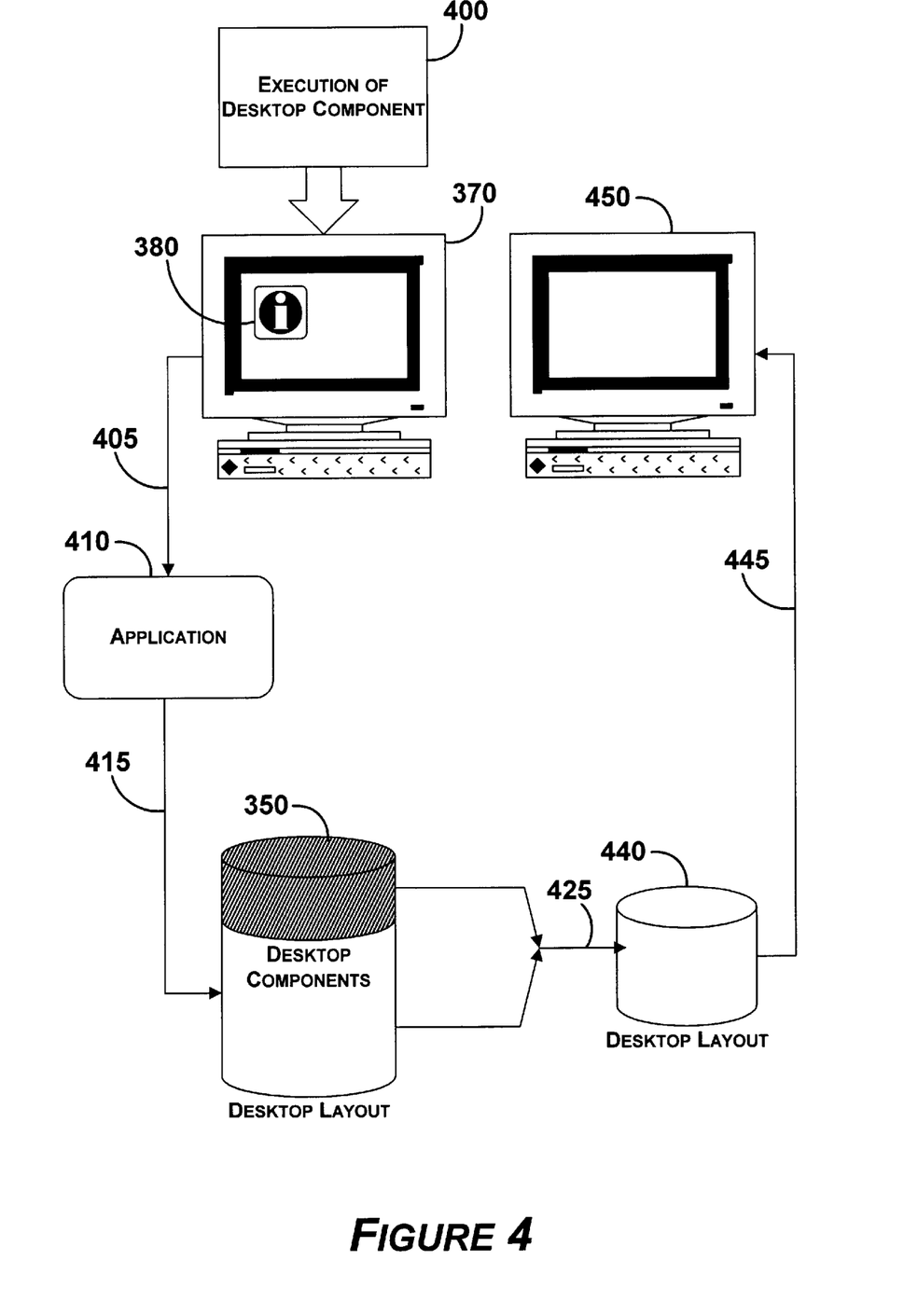
FIG. 4 is a block diagram showing the execution of a customized application according to the present invention.

FIG. 4 shows a method by which a customized desktop component 230 application may remove its associated graphical image 380 following execution of the customized desktop components 230. When the user selects graphical image 380 from user display 370, using a mouse or other input device, operating system 300 executes application program 410. Upon execution of application 410, desktop component files including associated graphical image 380 are removed from desktop layout 350 resulting in new desktop layout 440. New desktop layout 440 may be much like the original desktop layout 210 shown in FIG. 3. As an alternative, application 410 could modify desktop layout 350 by removing the larger graphic image 380 with a smaller icon-sized image (not shown) for incorporation with new desktop layout 440. When the application program is completed, user display 370 no longer includes graphical image 380, although, as described above, it may contain a smaller icon-sized image instead (not shown).

Figure 5:
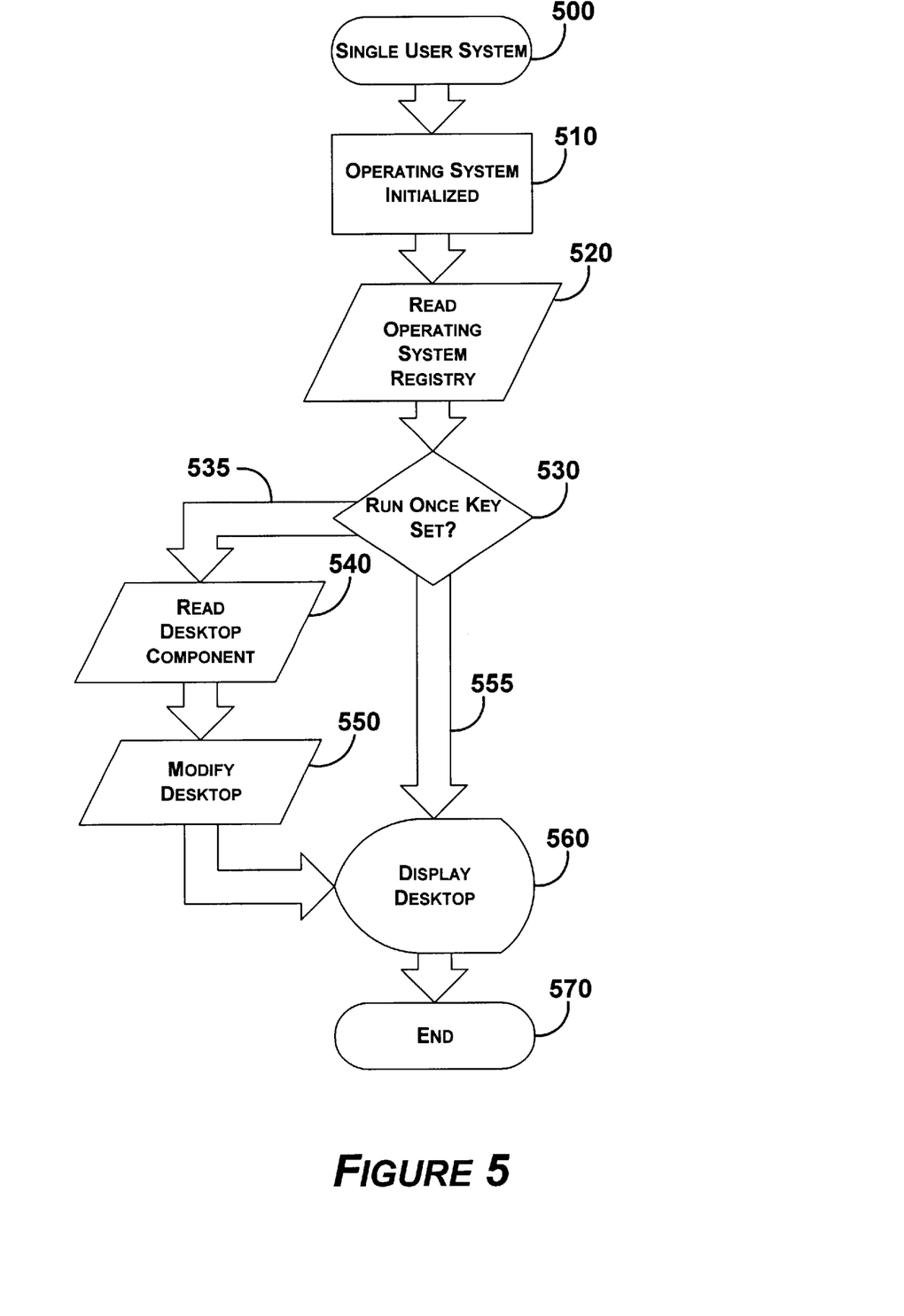
FIG. 5 is a flow chart showing the modification of the end user's desktop upon a first execution of a single-user operating system.

FIG. 5 shows a flowchart depicting, in general, how single computer system 500 uses a run once key under Windows 95™ to modify the desktop. When the user switches the computer system power on for the first time, the operating system 510 is initialized as installed by the manufacturer. As part of normal processing, read configuration files step 520 reads the configuration files 220 for a variety of system settings. As part of the manufacturer's installation process previously described, if run once key 530 is set, operating system performs customization functions on flow 535. These functions include desktop component installation information reading step 540 and desktop modifying step 550. Display desktop step 560 then displays the custom modifications from flow 535 to the user.

It is important that the customization functions are performed once but only once. Performing customization functions on flow 535 multiple times (i.e., upon each invocation of the operating system) could cause multiple graphic files to be written to desktop display 560 clutter the desktop display, cause unnecessary delays in booting the operating system, and could ultimately cause performance degradation of the computer system. In Windows 95™, a run once key runs a process one time and then removes the entry from the registry. In other operating systems, configuration files 220 may be used which would need to be modified by the installation program during its first invocation. In this manner, a subsequent invocation of operating system 510 by a single user would read the registry 520 and not find the run once key 530 that was originally set by the manufacturer. In this case, flow 555 would execute and the desktop display 560 would be shown to the user without performing customization functions on flow 535.

Figure 6:
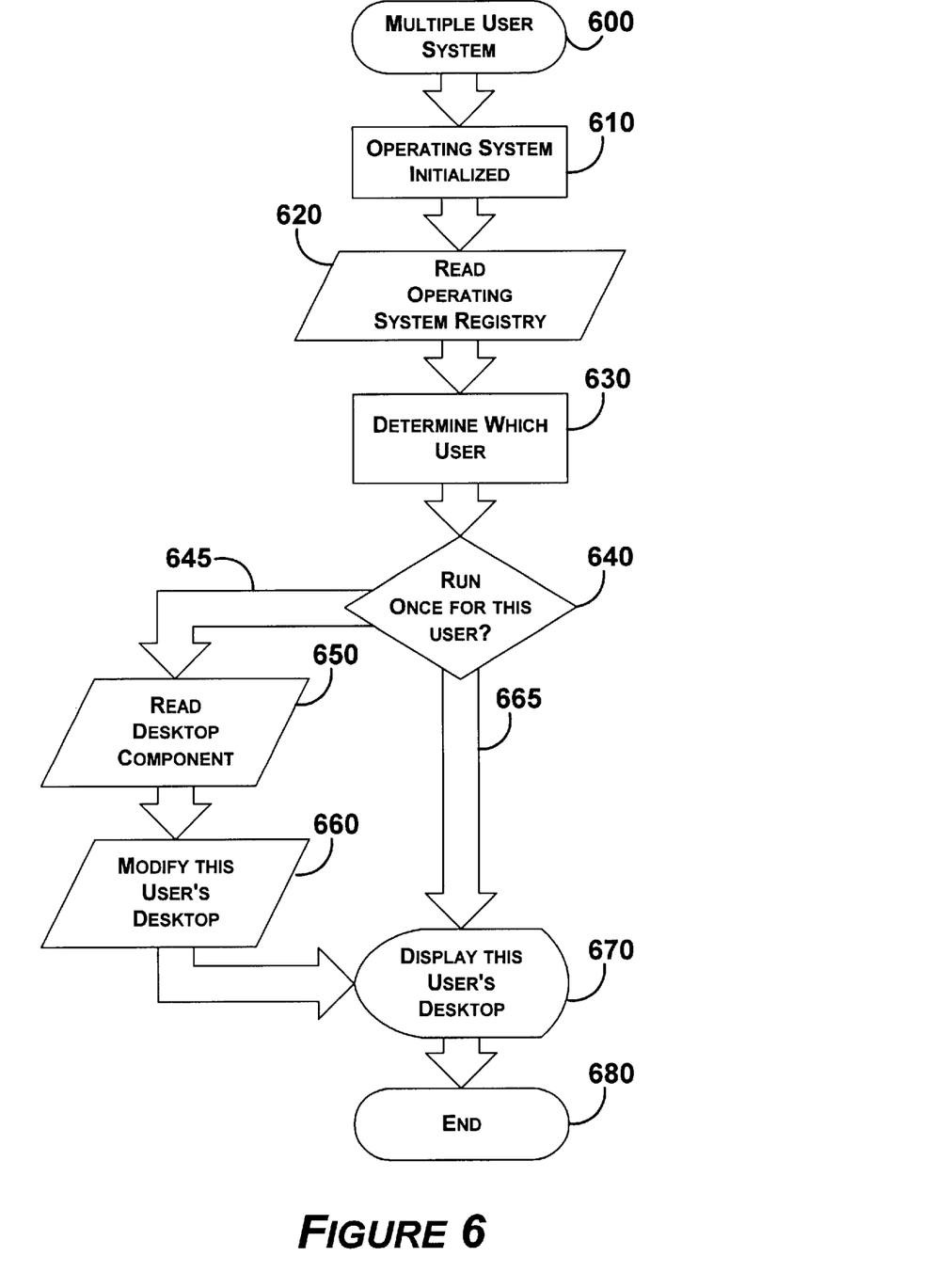
FIG. 6 is a flow chart showing a modification of the end user's desktop upon a first execution for each user of a multiple-user operating system.

Some operating systems, including Microsoft Windows NT™, can support multiple user configurations. FIG. 6 shows a flow diagram for handling multiple user operating system. In multiple user system 600 more than one end user can be registered to use the computer system. Each of the users in a multiple user system have a desktop layout 210 which may be customized so that each user can have his or her own unique desktop layout 210. In order to initialize the operating system, the user must enter his or her username and password. This information identifies the user uniquely to the operating system. Configuration files 220, the registry in Windows NT™, keeps track of the particular user using the operating system. The configuration files 220 maintain a profile for each user, for example, under HK_current_user, which includes the details of the desktop layout 210 for the particular user. When operating system is invoked for the first time at step 610, the registry containing the user profile is read along with a run once key. The user would have entered their user name and password upon invoking the operating system identifying the user to the operating system. Windows NT™ version 4.0 or 5.0 does not contain a "run once for every user" key so some amount of computation must be performed to determine whether flow 645 has been previously executed for this user to read the desktop component 650 and modify this user's desktop 660. One way decision 640 could be undertaken would be a simple file with a list of the registered users from the registry and a flag for whether the particular user has performed flow 645 (i.e., read the customized desktop component 650 and modify the user's desktop layout 660). For every user who has not had their desktop layout customized, flow 645 would be executed before the operating system would display the user's desktop 670. On the other hand, if the flag was set, then decision 640 would be positive (yes) and the operating system would follow flow 665 and display the user's desktop 640 without executing flow 645.

Figure 7:
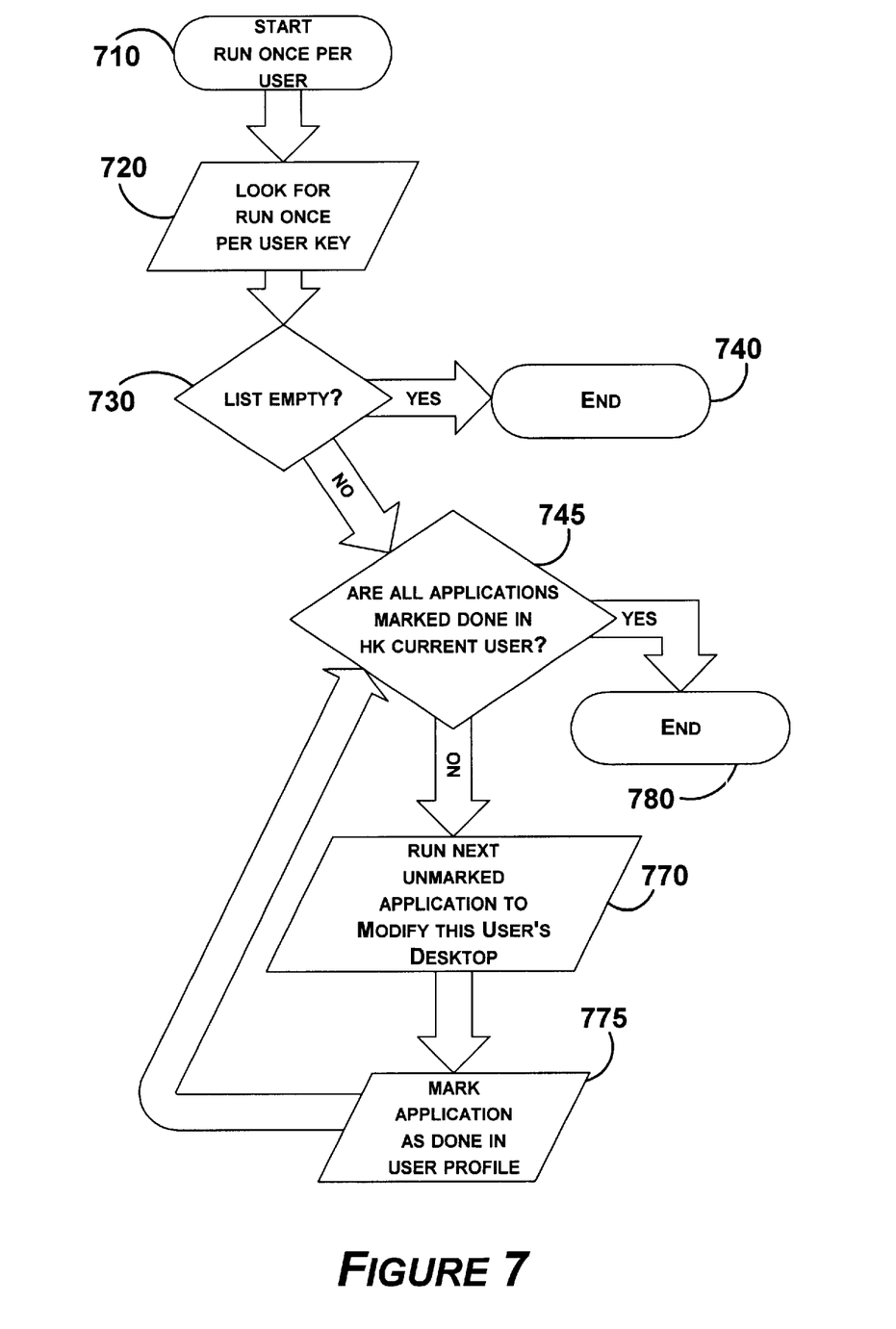
FIG. 7 is a flow chart showing a detailed method of executing a run once per user modification of the end user's desktop for a user of a multiple-user operating system.

Referring to FIG. 7, another novel method of invoking and performing decision 640 is described. Instead of a flag to indicate that a particular user performed flow 645, the method described FIG. 7 executes each time a user of a multiple-user system logs into the system. In a Windows NT™ system, for example, when a user logs into the system, part of the login protocol includes executing items in a "run list". The "run list" includes various functions, or "keys", that are run each time a user logs into the system. In accordance with an embodiment of the present invention, the "run list" includes the function "run once per user" 710. The system looks for the run once per user key at step 720. Next, at step 730, the run once per user list is checked to see if items present in the list. Any items in the list would include applications for desktop layout customization of the user's desktop as well as upgrade applications. At step 745, if the list is not empty, then the method performs a check to find out whether all applications in the list are marked "done". An application is marked "done" if the application has been previously installed for the user. If all applications are marked "done", the "run once per user" function is completed at step 780. If an application is not marked "done" in the list, step 770 provides for running the next unmarked application. For example, a user new to the multiple-user operating system could require numerous customization programs to be installed. The following invocation of the run once per user key could require only a simple upgrade to the user's desktop layout. A system manager could determine whether only an upgrade to a user's desktop layout or whether numerous applications must be installed by altering the list at step 730. The list could be the same list for a plurality of users or for a single or small group of users. The presence of a list is checked at step 730. If a list is present, the method next determines whether or not an application is already installed on a user's desktop layout at step 745, "Are all applications marked done in HK_current_user?" If some, but not all applications are marked done, the method runs the next unmarked application in step 770. By checking for unmarked applications in each user list, the method advantageously allows a list of applications for a desktop to be shared by the same for a group of users. The individual user profile list maintained for each user in the group keeps track of whether or not a particular application has been installed for a particular user. If an application has not been installed, step 770 runs the application and modifies the user's desktop accordingly. Advantageously, the running of the application at step 770 is transparent to the application. At step 775, the application is marked "done" in the user's profile. After the application is marked as "done", the list of applications is again checked for any "unmarked" applications by returning to step 745. When each application is marked "done", the "run once per user" function is complete at step 780.

Figure 8:
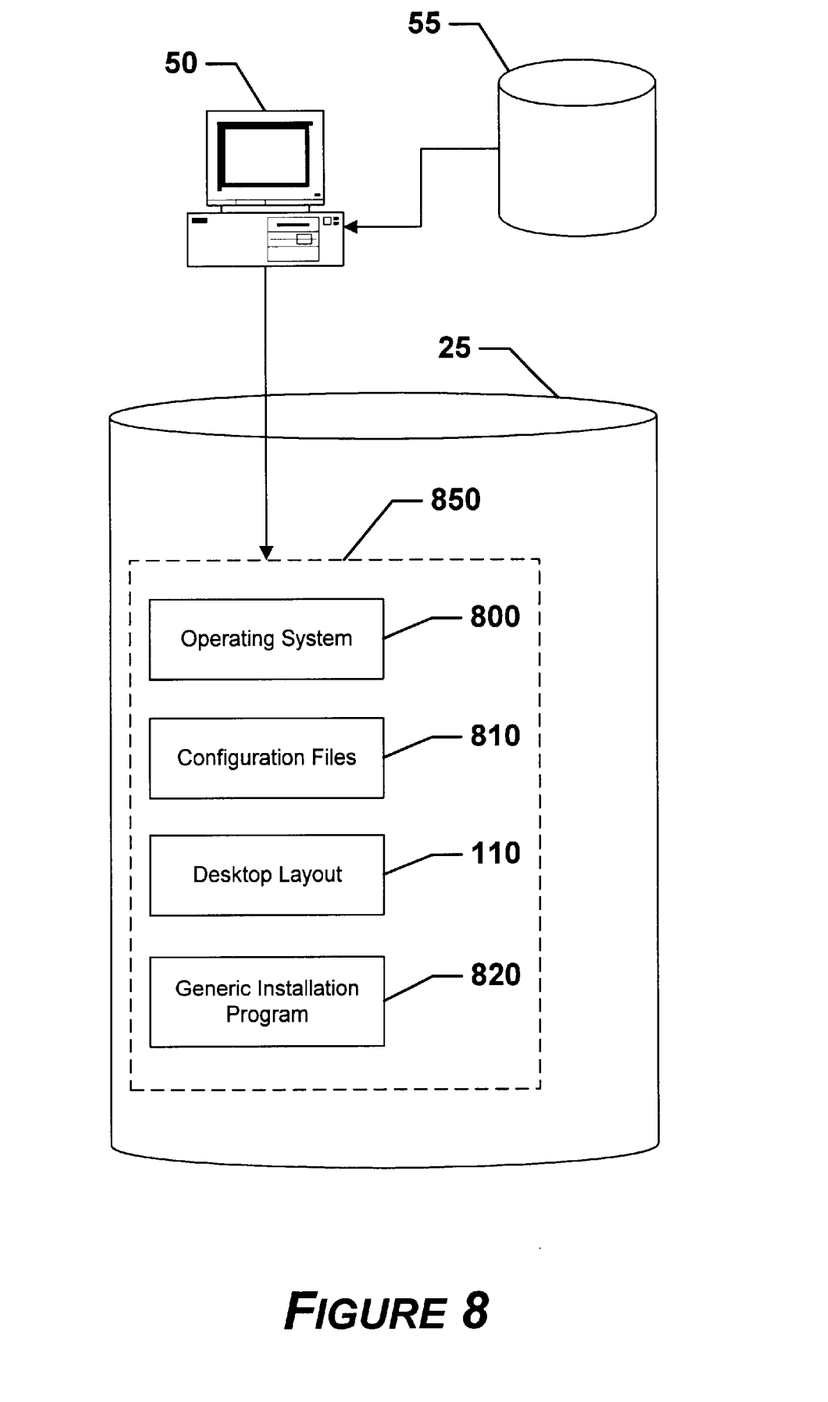
FIG. 8 is a block diagram showing a generic installation program and operating system installed to a nonvolatile storage device during manufacturing.
Figure 9:
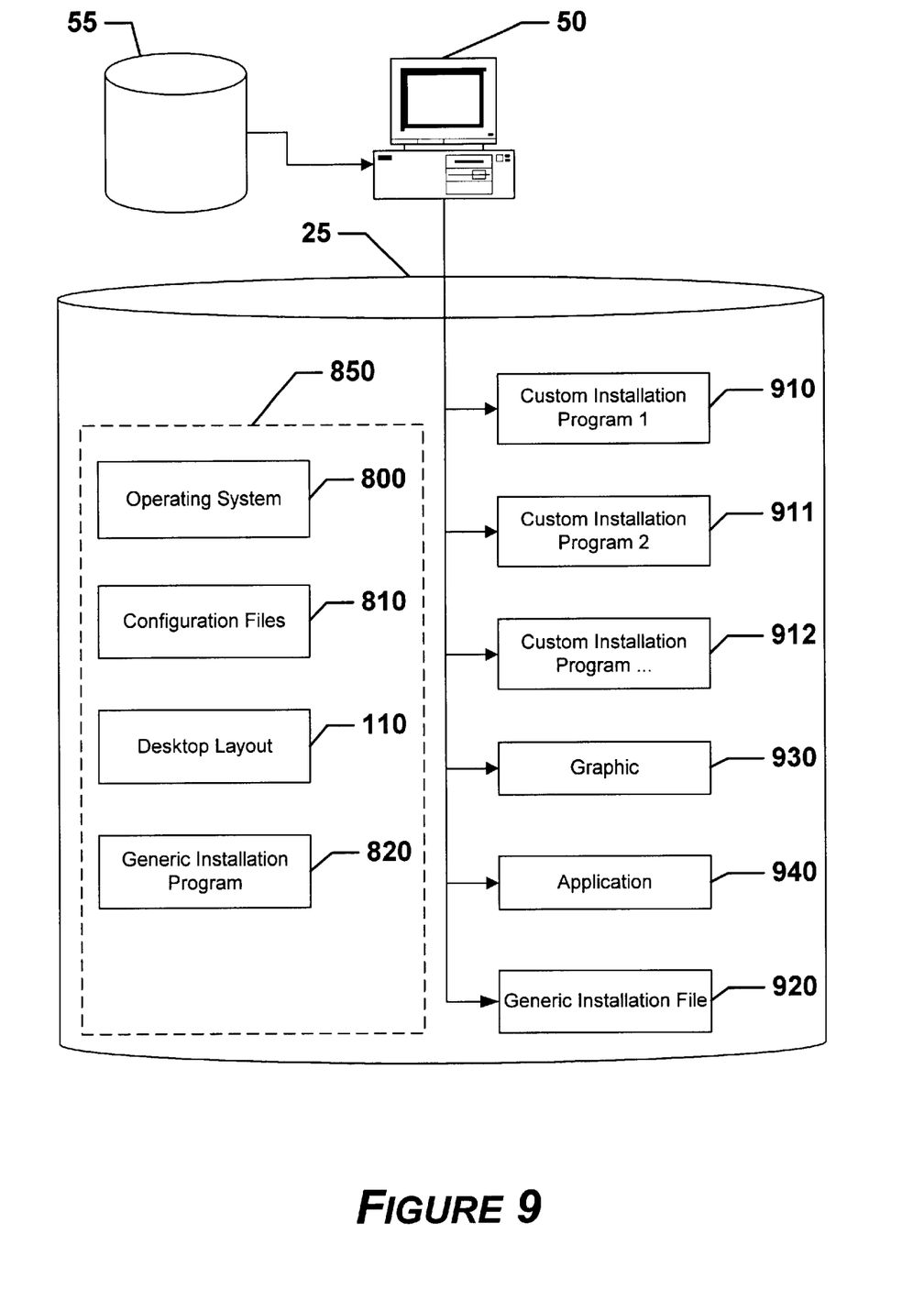
FIG. 9 is a block diagram showing custom installation files installed to a nonvolatile storage device during manufacturing.
Figure 10:
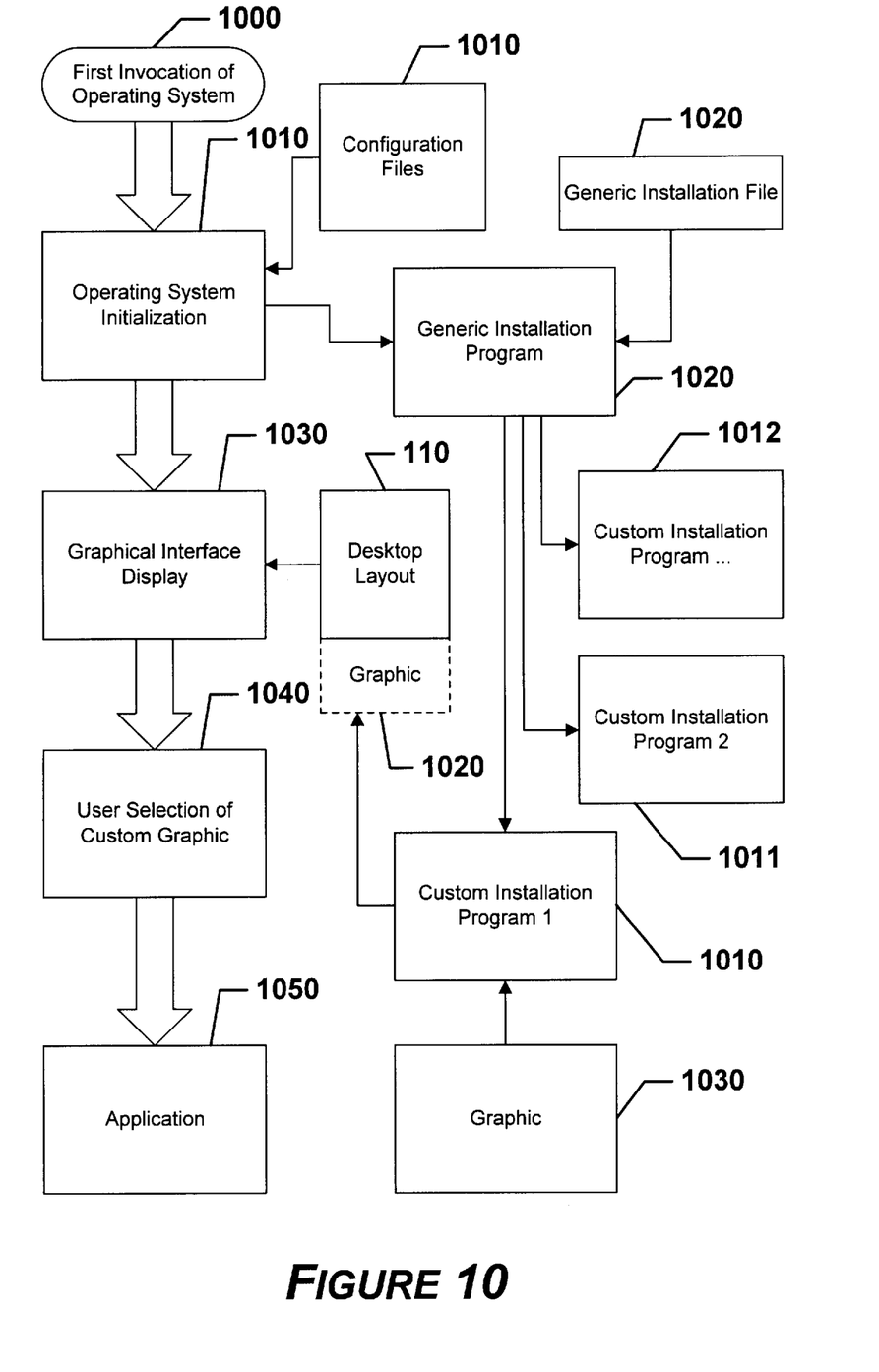
FIG. 10 is a block diagram depicting usage of installed files by the end user's computer system during a first invocation of the operating system.

Turning now to FIG. 8, the disk image 155 is copied by manufacturing system onto nonvolatile storage device 125 of the computer system 100 (not shown), as shown above (see, e.g., FIG. 1). FIG. 10 shows more particularly the files contained in disk image 155 and copied to nonvolatile storage device 125 to enable generic installation of custom components. Following the copying of disk image 155, nonvolatile storage device 125 includes the operating system 1000 as provided by the operating system manufacturer, desktop layout 210, also as provided by the operating system manufacturer. In addition, generic installation program 1020 is included in disk image 155 and copied to nonvolatile storage device 125. Configuration files 220, i.e., registry files, are modified to include instructions to execute generic installation program 1020 upon the operating systems next invocation. The standard files 1050 copied to nonvolatile storage device 125, include operating system 1000, configuration files 220, desktop layout 210, and generic installation program 1020.

To create disk image 155 to contain the aforementioned files, the operating system would be installed onto a new hard disk drive, the generic installation program would be copied to the same hard drive, and the configuration files 220 would be modified so that the operating system would be instructed to invoke the generic installation program upon the operating system's next invocation (i.e., in Windows 95™ modifying a "run once" registry key to add the name of the generic installation program). At this point, an image of the hard disk (as modified) would be taken to create disk image 155.

FIG. 10 shows the custom components that are copied using custom installation system 170 from nonvolatile storage device 125 containing custom components 175 to nonvolatile storage device 125 of computer system 100 (not shown). Standard files 1050 were previously installed onto nonvolatile storage device 125 as described above. Custom installation system 170 copies customization files onto nonvolatile storage device 125 to customize computer system 100 for the end user. Decisions related to the type and quantity of customized files, and therefore the customization performed, on the end user's computer depends on the manufacturer's intention and customizations which may have been requested by the customer (i.e., a corporation may wish to have certain customizations installed on every personal computer it orders for its employees). Custom installation program 1010 is copied to nonvolatile storage device 125 along with a corresponding entry written to generic installation file 1020 which identifies the name of custom installation program 1010. Generic installation file 1020 has a specific name or handle so that generic install program 1020 can read entries from generic installation file 1020 and invoke those custom installation programs listed in generic installation file 1020. Having modified configuration files 220 to reference generic installation program 1020 which acts upon generic installation file 1020 allows the system to perform custom modifications upon the user's first invocation of the operating system without changing the operating system files during manufacture of each custom system. Also included in custom components 175 are graphic files 1030 and applications 1040 which are used by custom installation program 1010 as explained below.

FIG. 10 shows the program calls and functions during first execution 1000 by the end user following the setup procedures described above. Upon first execution 1000, operating system initialization 1010 begins initialization of the operating system by reading configuration files 220. At least one entry in configuration files 220 references causes the operating system to invoke generic installation program 1020. Generic installation program 1020 determines which, if any, custom installation programs 1010 need to be invoked to customize the operating system for the end user. If no entries exist in generic installation file 1020 (i.e., no customization was prepared by the manufacturer), then generic installation program 1020 exits and graphical interface display 1030 is performed by the operating system by reading the desktop layout 210 and displaying the graphical interface display 1030 to the end user.

If entries do exist in generic installation file 1020, then custom installation programs 1010 relating to the entries are called and executed by the operating system. Any number of these custom install programs may modify desktop layout 210 with graphics previously stored in graphics files 1030 during the custom installation process described above. Custom installation program 1010 modifies desktop layout 210 using data from custom graphic file 1030 forming custom graphic 1020 on desktop layout 210. Following the termination of the last custom installation program 1012, control is returned to generic installation program 1020 which in turn exits returning control to operating system initialization 1010. Upon completion of operating system initialization 1010, graphical interface display 1030 is displayed to user. Graphical interface display 1030 reads files comprising the desktop layout including original desktop layout 210 and custom graphic image 1020.

When the end user views the desktop for the first time, the standard graphics along with the custom graphics are visible. The end user can now select custom graphic 1020 using a pointing device (i.e., trackball or mouse) or keyboard. When custom graphic 1020 is selected by the end user, the operating system invokes custom application 1050 associated with custom graphic 1020. In many graphical based operating systems, including those referenced above, the association between custom graphic 1020 and custom application 1050 is through properties assigned to custom graphic 1020 that were set during the foregoing custom graphic installation process.

The description of the invention set forth herein is illustrative and not intended to limit the scope of the invention as set forth in the following claims. Variations and modifications of the embodiments disclosed herein may be made based on the descriptions set forth herein, without departing from the scope and spirit of the invention as set forth in the following claims.

What is claimed is:

1. A method for modifying a graphical user interface controlled by an operating system, comprising:

reading a configuration file;

calling an installation program, the calling being an instruction from the configuration file; and altering the graphical user interface during an invocation of the operating system by a user according to the installation program, wherein the altering further includes determining that an invocation of the operating system is the first invocation of the operating system.

2. The method as recited in claim 1, wherein the configuration file includes a registry and wherein the altering results from reading a run once key of the registry.

3. The method as recited in claim 1, wherein the operating system is a windows type operating system.

4. The method as recited in claim 1, wherein the user is one of a plurality of users and wherein the method is performed upon a first invocation of the operating system by each of the plurality of users.

5. The method as recited in claim 1, wherein the method further comprises:

invoking the application program, the application program being related to a graphical image upon a selection of the graphical image by the user.

6. The method as recited in claim 1, wherein the altering further comprises:

removing a graphical image from the graphical user interface following a first invocation of the application program by the user.

7. The method as recited in claim 1, wherein the graphical image is related to an Active Desktop component.

8. A computer system comprising:

a processor;

a memory coupled to the processor;

a nonvolatile storage device coupled to the processor;

a desktop component stored on the nonvolatile storage device, the desktop component including a graphical image for display on a display device and one or more software objects;

an operating system coupled to the processor, wherein the operating system includes a graphical user interface for displaying graphical images on the display device, and one or more configuration files;

a software object stored on the nonvolatile storage device, the software object altering a configuration file associated with the graphical user interface upon execution of the software object by a user, wherein the altering includes a determination that an invocation of the operating system is the first invocation of the operating system by a user.

9. The computer system as recited in claim 8, wherein the one or more configuration files includes a registry.

10. The computer system as recited in claim 8, wherein the operating system is a windows type operating system.

11. The computer system as recited in claim 8, wherein the user is one of a plurality of users and wherein the software object alters a configuration file of the graphical user interface for each of the plurality of users.

12. The computer system as recited in claim 8, wherein one of the one or more software objects is responsive to a user selection of the graphical image.

13. The computer system as recited in claim 8, wherein the graphical image is related to an Active Desktop component.

14. A method for modifying a desktop of a user in a multiple user computer system with an operating system, the method comprising:

reading a configuration file related to the operating system;

invoking a program in response to the reading;

checking a list associated with the program, the list capable of providing a plurality of elements;

determining if an invocation of the operating system is the first invocation of the operating system;

if the list contains at least one element, checking whether the at least one element in the list has been executed on the desktop of the user; and if the element has not been executed for the user, executing the at least one element.

15. The method as recited in claim 14, further comprising:

after executing the at least one element, marking the at least one element as executed for the user.

16. The method as recited in claim 14, wherein the executing the at least one element includes removing at least one desktop component from the user's desktop.

17. The method as recited in claim 14, wherein the at least one element includes an application capable of modifying a user's desktop.

18. The method as recited in claim 14, wherein the executing the at least one element adds a graphical representation to a graphical user interface, wherein the added graphical representation is visible during one of a subsequent invocation of the operating system.

19. The method as recited in claim 14, wherein the user is one of a plurality of users and wherein the method is performed upon one of a first invocation of the operating system by each of the plurality of users and each invocation of the operating system by each of the plurality of users.

20. A computer system comprising:

a processor;

a memory coupled to the processor;

a nonvolatile storage device coupled to the processor;

an operating system coupled to the processor, wherein the operating system includes one or more configuration files; and a program stored on the nonvolatile storage device, the program being invoked upon a reading of one of the one or more configuration files;

a list associated with the program, the list capable of providing a plurality of elements, wherein:

if the list contains at least one element, the program checks whether the at least one element in the list has been executed on a desktop of a user;

if an invocation of the operating system is the first invocation of the operating system for the user; and if the element has not been executed for the user, the program executes the at least one element.

21. The computer system as recited in claim 20, wherein the one or more configuration files includes a registry.

22. The computer system as recited in claim 20, wherein the operating system is a windows type operating system.

23. The computer system as recited in claim 20, wherein the user is one of a plurality of users and wherein the program alters a configuration file for each of the plurality of users.

* * * * *